United States Patent Office 2,884,473
Patented Apr. 28, 1959

2,884,473

METHOD OF DEHYDROGENATING HYDROCARBONS USING A CALCIUM NICKEL PHOSPHATE CATALYST

Park McKnight Reilly and Edmund Philips Lewis, Sarnia, Ontario, and William James Lyman Kearns, Corunna, Ontario, Canada, assignors to Polymer Corporation Limited, Sarnia, Ontario, Canada, a corporation of Canada No Drawing. Application April 23, 1956
Serial No. 579,740

15 Claims. (Cl. 260—680)

This invention relates to the dehydrogenation of a monoolefin having at least four carbon atoms in the unsaturated chain using a catalyst, the active ingredient of which is calcium nickel phosphate; a suitable catalyst is a calcium nickel phosphate-chromium oxide catalyst. It relates more specifically to the dehydrogenation of isopentene to isoprene, or to the dehydrogenation of n-butylene to butadiene-1,3 using the said calcium nickel phosphate-chromium oxide catalyst. This catalyst is the one which is described broadly in U.S. Patent 2,442,320, Andrew J. Dietzler et al. or in British Patent No. 634,580.

In the normal commercial operations of such process, and using a pelleted form of such calcium nickel phosphate type catalyst, side reactions occur which cause carbonaceous deposits to be formed on the catalyst. Such deposits indicate that the reaction is not entirely selective. Because of the formation of such deposits, it has been necessary to adopt a cyclic process comprising continuous alternation of operations which effect dehydrogenation and removal of carbon deposit from the catalyst. This latter step is known as regeneration. The dehydrogenation is normally effected by passing a mixed feed of the olefin and steam through a bed of catalyst, while the regeneration is normally effected by passing a mixture of air and steam through the catalyst bed. These two operations are normally called the process and regeneration phases or periods, respectively. The process and regneration periods are usually, though not necessarily equal in duration.

It is usual, though not necessary, to maintain the temperature of the air-steam regeneration mixture entering the catalyst bed approximately equal to the temperature at which the steam-hydrocarbon mixture enters the catalyst bed during the process phase. This latter temperature is ordinarily called the process mixed feed temperature. The regeneration of the catalyst is exothermic and the temperature of the catalyst bed is thereby substantially raised during regeneration. The greater the amount of such deposit on the catalyst, the greater is the rise in temperature during regeneration. It is quite possible for the maximum regeneration temperature to exceed the process mixed feed temperature by over 250 Fahrenheit degrees. This difference between maximum regeneration temperature and process mixed feed temperature on the preceding process phase is herein defined as "ΔF." It will be recognized that the ΔF depends to some extent on the relationship between the process mixed feed temperature and the temperature of the air-steam mixture entering the catalyst bed during the regeneration phase. Throughout this discussion it is assumed that the regeneration mixture temperature and process mixed feed temperature are either equal or the difference between them is constant.

It is appreciated that a large ΔF is indicative of poor catalyst condition or performance and must be remedied; otherwise the effective life of the catalyst will be greatly reduced. This is extremely serious, since the cost of catalyst for a unit of twin reactors may be upwards of $150,000.00. It has been attempted to reduce the exothermic effect of the regeneration reaction by limiting the amount of air used in regeneration, but this generally results in slowing down the regeneration reaction to a point at which it is no longer commercially practicable. A substantial quantity of air is thus normally required.

One manner of treating the catalyst so as to improve the duration of its effective life while maintaining a satisfactorily rapid regeneration process is given in copending application Serial No. 340,653 (now abandoned). In such application, it is disclosed that the dehydrogenation reaction comprises effecting part of the dehydrogenation at a temperature at least 15 Fahrenheit degrees below the desired main reaction temperature and subsequently effecting the dehydrogenation at the main reaction temperature. It is stated, moreover, that it is generally necessary to maintain the reduced temperature during the dehydrogenation operation of at least one dehydrogenation-regeneration cycle in order to obtain an appreciable improvement in the catalyst. It is stated, furthermore, that the preferred form of the invention comprises commencing the dehydrogenation with a new catalyst at an initial temperature below 1050° F. and gradually increasing such temperature over a period of time involving a substantial number of dehydrogenation-regeneration cycles until the desired reaction temperature is reached. In such preferred form of the invention it is stated that the best results can be obtained if the gradual increase in temperature is controlled so that the ΔF is always maintained below 80 Fahrenheit degrees or preferably below 50 Fahrenheit degrees. The period of time over which the temperature is brought up to the desired main reaction temperature is preferably 3 to 7 days. The lower limit of the initial temperature is implicit in the need for reaction to occur at such temperature. It is stated that the lower limit of such temperature is preferably 1000° F. but that it may be as low as 950° F. with over-active catalysts.

It is an object of the present invention to disclose an improvement in the above described copending application. More particularly the object of this invention is to coordinate the reaction cycle time in conjunction with the feed temperature in order to maintain optimum conditions.

These and other objects are obtained in the dehydrogenation of a monoolefin having at least four carbon atoms in the unsatured carbon chain using a calcium nickel phosphate-chromium oxide catalyst and comprising the continuously alternating operations of effecting dehydrogenation of said monoolefin and regeneration of the catalyst, the improvement which comprises effecting such reaction at gradually increasing process mixed feed temperatures until a temperature is reached which is indicative of the stage in the reaction where ΔF would tend to increase from cycle to cycle, and preventing such ΔF from increasing by co-ordinating the duration of the process period and the temperature of the entering reactants, in accordance with any of the following alternative procedures: (1) continuing said reaction with a decreased duration of the process period while maintaining the temperature of the entering reactants substantially constant whereby to maintain ΔF substantially constant from cycle to cycle by preventing ΔF from increasing from cycle to cycle; (2) continuing said reaction with a decreased temperature of the entering reactants while maintaining the duration of the process period substantially constant whereby to maintain ΔF substantially constant from cycle to cycle by preventing ΔF from increasing from cycle to cycle; (3) continuing said reaction with a decreased duration of the process period and with a decreased temperature of the entering reactants, whereby to maintain ΔF substantially constant from cycle to cycle by preventing ΔF from increasing from cycle to cycle.

It has been found that, if the duration of the process period is held constant, the ΔF can be decreased by reducing the process mixed feed temperature or, conversely, it can be increased by increasing the process mixed feed temperature. If the process mixed feed temperature is held constant, it has been found that the ΔF can be decreased by decreasing the duration of the process period and increased by increasing the duration of the process period.

It is generally understood that the process mixed feed temperature is from 950° F. to 1350° F. In the process and regeneration periods, the total time for the dehydrogenation and regeneration, the two periods being approximately equal in duration, is normally less than 120 minutes, although greater times are, of course, feasible.

The following examples are given to show the manner of co-ordinating the cycle times and temperatures of the hydrocarbon mixed feed entering the reactor so that the advantages of the present invention are achieved.

EXAMPLE I

This example illustrates the control of ΔF by variations in the total time of cycles, the process period being half of the total cycle time, feed temperature being kept constant.

The normal dehydrogenation of n-butylene to butadiene-1,3 was carried out for several cycles in the conventional manner. During the course of such conventional operation, the temperature of the mixed hydrocarbon feed and ΔF were determined. Then, with the mixed feed temperature held approximately constant, the cycle times were varied. The results are given below in Table I.

*Table I*

| Cycle No. | Mixed Feed Temperature (° F.) | ΔF (F.°) | Total Cycle Time, minutes |
|---|---|---|---|
| 1 | 1,145 | 94 | |
| 2 | 1,145 | 89 | |
| 3 | 1,143 | 92 | 120 |
| 4 | 1,145 | 91 | |
| 5 | 1,143 | 93 | |
| 6 | 1,145 | 70 | |
| 7 | 1,147 | 67 | |
| 8 | 1,145 | 65 | |
| 9 | 1,146 | 73 | |
| 10 | 1,147 | 65 | 90 |
| 11 | 1,145 | 89 | |
| 12 | 1,148 | 73 | |
| 13 | 1,145 | 76 | |
| 14 | 1,143 | 70 | |
| 15 | 1,141 | 100 | |
| 16 | 1,140 | 91 | |
| 17 | 1,140 | 92 | |
| 18 | 1,141 | 86 | |
| 19 | 1,140 | 96 | |
| 20 | 1,139 | 92 | 120 |
| 21 | 1,140 | 94 | |
| 22 | 1,140 | 83 | |
| 23 | 1,141 | 94 | |
| 24 | 1,140 | 90 | |
| 25 | 1,141 | 92 | |
| 26 | 1,137 | 86 | 100 |
| 27 | 1,140 | 71 | |

These results indicate that variation of the cycle time with the mixed feed temperature being held approximately constant, results in a control of ΔF. It is seen, moreover, that an increase in cycle time increases ΔF, while a decrease in cycle time decreases ΔF. Hence, in cases where it is desired to retain the mixed feed temperature constant, the ΔF may be maintained constant by a variation of the duration of the process period. That is, if ΔF increases, the duration of the process period is decreased; if ΔF decreases, the duration of the process period is increased.

EXAMPLE II

This example shows how ΔF may be controlled by variations in the temperature of the mixed hydrocarbon feed, with the cycle time being kept constant.

The normal dehydrogenation of n-butylene to butadiene-1,3, was carried out for several cycles using conventional cycle times, with the process mixed feed temperature held approximately constant at about 1167° F. It was then attempted to control ΔF by means of variation in the temperature of the mixed hydrocarbon feed. The results are given below in Table II.

*Table II*

| Cycle No. | Mixed Feed Temperature (° F.) | ΔF (F.°) |
|---|---|---|
| 1 | 1,167 | 110 |
| 2 | 1,173 | 111 |
| 3 | 1,167 | 128 |
| 4 | 1,163 | 140 |
| 5 | 1,142 | 85 |
| 6 | 1,139 | 108 |
| 7 | 1,094 | 25 |
| 8 | 1,094 | 31 |
| 9 | 1,097 | 35 |

This example shows that ΔF may be controlled by varying the temperature of the mixed feed. The ΔF was seen to increase from cycle to cycle during cycles 1 to 4 and such increase was terminated by a reduction of the temperature of the mixed feed. If this increase had not been terminated, a failure would have occurred as shown hereinbelow in Example III. Thus, if the ΔF increases from cycle to cycle, the temperature of the mixed feed should be decreased. Thus, in cases where it is desired to retain a predetermined duration of process period, the ΔF may be controlled by a suitable variation in the temperature of the mixed feed.

Of course, it is possible that, under certain conditions, the amount of freedom of variation of either the temperature of the mixed feed or the cycle time may be limited. Hence, the desired control of ΔF may be achieved by the simultaneous variation of duration of process period and temperature of the mixed feed.

EXAMPLE III

The following example shows a failure of the catalyst. The normal dehydrogenation of n-butylene to butadiene-1,3 was carried out in the conventional manner. The results are given below in Table III.

*Table III*

| Cycle No. | Mixed Feed Temperature (° F.) | ΔF (F.°) at thermocouple |
|---|---|---|
| 1 | 1,160 | 55 |
| 2 | 1,160 | 90 |
| 3 | 1,160 | 200 |
| 4 | 1,160 | 140 |

This example illustrates a failure of the catalyst. On cooling and examining the reactor there was found to be within the bed an excess of carbonaceous material which was not burned off during the regeneration cycle. In cycle No. 4 of Table III, the apparent ΔF is seen to decrease. This was found to be caused by the thermocouple being insulated from the actual regeneration temperature by means of a carbonaceous deposit. The presence of such carbonaceous deposit is indicative of catalyst failure.

What we claim is:

1. In the dehydrogenation of a monoolefin having at least four carbon atoms in the unsaturated carbon chain using a catalyst, the active ingredient of which is calcium nickel phosphate and comprising the continuously alternating operations of effecting dehydrogenation of said monoolefin and regeneration of the catalyst at a process mixed feed temperature of 950–1350° F., the improvement which comprises effecting such reaction at gradually increasing process mixed feed temperatures, determining $\Delta F$, continuing the reaction until a temperature is reached which is indicative of the stage in the reaction where $\Delta F$ would tend to increase from cycle to cycle, and continuing said reaction with a decreased duration of the process period while maintaining the temperature of the entering reactants substantially constant within a temperature range of a maximum of 1350° F. and a minimum of 950° F. whereby to maintain $\Delta F$ substantially constant from cycle to cycle.

2. In the dehydrogenation of n-butylene to butadiene-1,3 using a calcium nickel phosphate-chromium oxide catalyst and comprising the continuously alternating operations of effecting dehydrogenation of said n-butylene and regeneration of the catalyst at a process mixed feed temperature of 950–1350° F. the improvement which comprises effecting such reaction at gradually increasing process mixed feed temperatures, determining $\Delta F$, continuing the reaction until a temperature is reached which is indicative of the stage in the reaction where $\Delta F$ would tend to increase from cycle to cycle, and continuing said reaction with a decreased duration of the process period while maintaining the temperature of the entering reactants substantially constant within a temperature range of a maximum of 1350° F. and a minimum of 950° F. whereby to maintain $\Delta F$ substantially constant from cycle to cycle.

3. In the dehydrogenation of n-butylene to butadiene-1,3 using a calcium nickel phosphate-chromium oxide catalyst and comprising the continuously alternating operations of effecting dehydrogenation of said n-butylene and regeneration of the catalyst, at a process mixed feed temperature of 950–1350° F., the improvement which comprises effecting such reaction at gradually increasing process mixed feed temperatures, determining $\Delta F$, continuing the reaction until a temperature is reached which is indicative of the stage in the reaction where $\Delta F$ would tend to increase from cycle to cycle, and continuing said reaction, with the duration of the process period decreased from a maximum time of about 60 minutes to a minimum time of about 30 minutes while maintaining the temperature of the incoming reactants substantially constant whereby to maintain $\Delta F$ substantially constant from cycle to cycle.

4. In the dehydrogenation of a monoolefin having at least four carbon atoms in the unsaturated carbon chain using a catalyst, the active ingredient of which is calcium nickel phosphate and comprising the continuously alternating operations of effecting dehydrogenation of said monoolefin and regeneration of the catalyst at a process mixed feed temperature of 950–1350° F., the improvement which comprises effecting such reaction at gradually increasing process mixed feed temperatures, determining $\Delta F$, continuing the reaction until a temperature is reached which is indicative of the stage in the reaction where $\Delta F$ would tend to increase from cycle to cycle, and continuing said reaction with a decreased temperature of the entering reactants within a temperature range of a maximum of 1350° F. and a minimum of 950° F. while maintaining the duration of the process period substantially constant whereby to maintain $\Delta F$ substantially constant from cycle to cycle.

5. In the dehydrogenation of a monoolefin having at least four carbon atoms in the unsaturated carbon chain using a catalyst, the active ingredient of which is calcium nickel phosphate and comprising the continuously alternating operations of effecting dehydrogenation of said monoolefin and regeneration of the catalyst at a process mixed feed temperature of 950–1350° F., the improvement which comprises effecting such reaction at gradually increasing process mixed feed temperatures, determining $\Delta F$ continuing the reaction until a temperature is reached which is indicative of the stage in the reaction where $\Delta F$ would tend to increase from cycle to cycle, and continuing said reaction with a decreased duration of the process period and with a decreased temperature of the entering reactants within a temperature range of a maximum of 1350° F. and a minimum of 950° F., whereby to maintain $\Delta F$ substantially constant from cycle to cycle.

6. In the dehydrogenation of n-butylene to butadiene-1,3 using a calcium nickel phosphate-chromium oxide catalyst and comprising the continuously alternating operations of effecting dehydrogenation of said n-butylene and regeneration of the catalyst at a process mixed feed temperature of 950–1350° F., the improvement which comprises effecting such reaction at gradually increasing process mixed feed temperatures, determining $\Delta F$, continuing the reaction until a temperature is reached which is indicative of the stage in the reaction where $\Delta F$ would tend to increase from cycle to cycle, and continuing said reaction with a decreased temperature of the entering reactants within a temperature range of a maximum of 1350° F. and a minimum of 950° F. while maintaining the duration of the process period substantially constant whereby to maintain $\Delta F$ substantially constant from cycle to cycle.

7. In the dehydrogenation of n-butylene to butadiene-1,3 using a calcium nickel phosphate-chromium oxide catalyst and comprising the continuously alternating operations of effecting dehydrogenation of said n-butylene and regeneration of the catalyst at a process mixed feed temperature of 950–1350° F., the improvement which comprises effecting such reaction at gradually increasing process mixed feed temperatures, determining $\Delta F$, continuing the reaction until a temperature is reached which is indicative of the stage in the reaction where $\Delta F$ would tend to increase from cycle to cycle, and continuing said reaction with a decreased duration of the process period and with a decreased temperature of the entering reactants within a temperature range of a maximum of 1350° F. and a minimum of 950° F. whereby to maintain $\Delta F$ substantially constant from cycle to cycle.

8. In the dehydrogenation of n-butylene to butadiene-1,3 using a calcium nickel phosphate-chromium oxide catalyst and comprising the continuously alternating operations of effecting dehydrogenation of said n-butylene and regeneration of the catalyst, at a process mixed feed temperature of 950–1350° F., the improvement which comprises effecting such reaction at gradually increasing process mixed feed temperatures, determining $\Delta F$, continuing the reaction until a temperature is reached which is indicative of the stage in the reaction where $\Delta F$ would tend to increase from cycle to cycle, and continuing said reaction with the temperature of the entering reactants decreased within a temperature range of a maximum of about 1250° F. and a minimum of 1100° F. while maintaining the duration of the process period substantially constant whereby to maintain $\Delta F$ substantially constant from cycle to cycle.

9. In the dehydrogenation of n-butylene to butadiene-1,3 using a calcium nickel phosphate-chromium oxide catalyst and comprising the continuously alternating operations of effecting dehydrogenation of said n-butylene and regeneration of the catalyst, at a process mixed feed temperature of 950–1350° F., the improvement which comprises effecting such reaction at gradually increasing process mixed feed temperatures, determining $\Delta F$, continuing the reaction until a temperature is reached which is indicative of the stage in the reaction whereby $\Delta F$ would tend to increase from cycle to cycle, and continuing said reaction with the duration of the process period decreased from a maximum time of about 60 minutes to a minimum time of about 30 minutes and with the temperature of the entering reactants decreased within a temperature range of a maximum of about 1250° F. and a minimum of about 1100° F. whereby to maintain $\Delta F$ substantially constant from cycle to cycle.

10. In the dehydrogenation of a monoolefin having at least four carbon atoms in the unsaturated carbon chain using a calcium nickel phosphate-chromium oxide catalyst and comprising the continuously alternating operations of effecting dehydrogenation of said monoolefin and regeneration of the catalyst at a process mixed feed temperature of 950–1350° F., the improvement which comprises effecting such reaction at gradually increasing process mixed feed temperatures, determining $\Delta F$, continuing the reaction until a temperature is reached which is indicative of the stage in the reaction where $\Delta F$ would tend to increase from cycle to cycle, and continuing said reaction with a decreased temperature of the entering reactants within a temperature range of a maximum of 1350° F. and a minimum of 950° F. while maintaining the duration of the process period substantially constant whereby to maintain $\Delta F$ substantially constant from cycle to cycle.

11. In the dehydrogenation of a monoolefin having at least four carbon atoms in the unsaturated carbon chain using a calcium nickel phosphate-chromium oxide catalyst and comprising the continuously alternating operations of effecting dehydrogenation of said monoolefin and regeneration of the catalyst at a process mixed feed temperature of 950–1350° F., the improvement which comprises effecting such reaction at gradually increasing process mixed feed temperatures, determining $\Delta F$, continuing the reaction until a temperature is reached which is indicative of the stage in the reaction where $\Delta F$ would tend to increase from cycle to cycle, and continuing said reaction with a decreased duration of the process period while maintaining the temperature of the entering reactants substantially constant within a temperature range of a maximum of 1350° F. and a minimum of 950° F. whereby to maintain $\Delta F$ substantially constant from cycle to cycle.

12. In the dehydrogenation of a monoolefin having at least four carbon atoms in the unsaturated carbon chain using a calcium nickel phosphate-chromium oxide catalyst and comprising the continuously alternating operations of effecting dehydrogenation of said monoolefin and regeneration of the catalyst at a process mixed feed temperature of 950–1350° F., the improvement which comprises effecting such reaction at gradually increasing process mixed feed temperatures, determining $\Delta F$ continuing the reaction until a temperature is reached which is indicative of the stage in the reaction where $\Delta F$ would tend to increase from cycle to cycle, and continuing said reaction with a decreased duration of the entering re- and with a decreased temperature of the entering reactants within a temperature range of a maximum of 1350° F. and a minimum of 950° F., whereby to maintain $\Delta F$ substantially constant from cycle to cycle.

13. In the dehydrogenation of monoolefins having at least four carbon atoms in the unsaturated carbon chain using a calcium nickel phosphate-chromium oxide catalyst and comprising the continuously alternating operations of effecting dehydrogenation of said n-butylene and regeneration of the catalyst, at a process mixed feed temperature of 950–1350° F., the improvement which comprises effecting such reaction at gradually increasing process mixed feed temperatures, determining $\Delta F$, continuing the reaction until a temperature is reached which is indicative of the stage in the reaction where $\Delta F$ would tend to increase from cycle to cycle, and continuing said reaction, with the duration of the process period decreased from a maximum time to about 60 minutes to a minimum time of about 30 minutes while maintaining the temperature of the incoming reactants substantially constant whereby to maintain $\Delta F$ substantially constant from cycle to cycle.

14. In the dehydrogenation of monoolefins having at least four carbon atoms in the unsaturated carbon chain using a calcium nickel phosphate-chromium oxide catalyst and comprising the continuously alternating operations of effecting dehydrogenation of said n-butylene and regeneration of the catalyst, at a process mixed feed temperature of 950–1350° F., the improvement which comprises effecting such reaction at gradually increasing process mixed feed temperatures, determining $\Delta F$, continuing the reaction until a temperature is reached which is indicative of the stage in the reaction where $\Delta F$ would tend to increase from cycle to cycle, and continuing said reaction with the temperature of the entering reactants decreased within a temperature range of a maximum of about 1250° F. and a minimum of 1100° F. while maintaining the duration of the process period substantially constant whereby to maintain $\Delta F$ substantially constant from cycle to cycle.

15. In the dehydrogenation of monoolefins having at least four carbon atoms in the unsaturated carbon chain using a calcium nickel phosphate-chromium oxide catalyst and comprising the continuously alternating operations of effecting dehydrogenation of said n-butylene and regeneration of the catalyst, at a process mixed feed temperature of 950–1350° F., the improvement which comprises effecting such reaction at gradually increasing process mixed feed temperatures, determining $\Delta F$, continuing the reaction until a temperature is reached which is indicative of the stage in the reaction whereby $\Delta F$ would tend to increase from cycle to cycle, and continuing said reaction with the duration of the process period decreased from a maximum time of about 60 minutes to a minimum time of about 30 minutes and with the temperature of the entering reactants decreased within a temperature range of a maximum of about 1250° F. and a minimum of about 1100° F. whereby to maintain $\Delta F$ substantially constant from cycle to cycle.

References Cited in the file of this patent
UNITED STATES PATENTS

| | | |
|---|---|---|
| 2,442,320 | Britton et al. | May 25, 1948 |
| 2,474,014 | Seebold | June 21, 1949 |

UNITED STATES PATENT OFFICE

CERTIFICATE OF CORRECTION

Patent No. 2,884,473                                          April 28, 1959

Park McKnight Reilly et al

It is hereby certified that error appears in the printed specification of the above numbered patent requiring correction and that the said Letters Patent should read as corrected below.

Column 2, line 49, for "unsatured" read -- unsaturated --; column 5, line 72, and column 7, line 45, after "$\Delta$ F" insert a comma; column 7, line 49, for "entering re-" read -- process period --; column 8, lines 1, 19, and 38, for "n-butylene" read -- nonoolefins --.

Signed and sealed this 1st day of December 1959.

(SEAL)
Attest:

KARL H. AXLINE
Attesting Officer

ROBERT C. WATSON
Commissioner of Patents